United States Patent [19]

Yamada et al.

[11] Patent Number: 6,006,184

[45] Date of Patent: Dec. 21, 1999

[54] TREE STRUCTURED COHORT SELECTION FOR SPEAKER RECOGNITION SYSTEM

[75] Inventors: Eiko Yamada; Hiroaki Hattori, both of Tokyo, Japan

[73] Assignee: NEC Corporation, Tokyo, Japan

[21] Appl. No.: 09/014,565

[22] Filed: Jan. 28, 1998

[30] Foreign Application Priority Data

Jan. 28, 1997 [JP] Japan .................................... 9-013562

[51] Int. Cl.$^6$ ....................................................... G10L 5/06
[52] U.S. Cl. ........................................... 704/246; 704/245
[58] Field of Search .................................... 704/239, 245, 704/246

[56] References Cited

PUBLICATIONS

Aaron E. Rosenberg and S. Parthasarathy, "Speaker Background Models for Connected Digit Password Speaker Verificationm," Proc. IEEE ICASSP 96, vol. 1, p. 81–84, May 1996.

J. M. Colombi, D. W. Ruck, S. K. Rogers, M. Oxley, and T. R. Anderson, "Cohort Selection and Word Grammar Effects for Speaker Recognition," Proc. ICASSP 96, vol. 1, p. 85–88, May 1996.

Kevin R. Farrell, Richard J. Mammone, and Khalel T. Assaleh, "Speaker Recognition Using Neural Networks and Conventional Classifiers," IEEE Trans. Speech and Audio Processing, vol. 2, No. 1, Part II, p. 194–205, Jan. 1994.

Higgins et al., "Speaker Verification Using Randomized Phrase Prompting", *Digital Signal Processing*, vol. 1:89–106, (1991).

Rosenberg et al., "The Use of Cohort Normalized Scores For Speaker Verification", *ICSLP92*, pp. 599–602.

Matsui et al., "Speaker Recognition Using Concatenated Phoneme Models", *ICSLP92*, pp. 603–606, (1992).

Kai–Fulee, "Large–Vocabulary Speaker–Independent Continuous Speech Recogition: The Shinx System", *CMU–CS–88–148*, pp. 103–108, (1988.4).

Furui, "Digital Speech Processing", pp. 44–47, (1985) (ET p. 64–67).

Kosaka et al., "Tree–Structured Speaker Clustering For Speaker Adaptation", *Singakugihou, SP93–110*, pp. 49–54, (1993–12).

Sakoe et al., "Recognition of Continuously Spoken Words Based on Time–Normalization", pp. 483–490 (1971).

Rabiner et al., "On the Application of Vector Quantization and Hidden Morkov Models to Speaker–Independent, Isolated Word Recognition", pp. 1075–1105 (1983).

*Primary Examiner*—David R. Hudspeth
*Assistant Examiner*—Tālivaldis Ivars Šmits
*Attorney, Agent, or Firm*—Foley & Lardner

[57] ABSTRACT

In a speaker recognition system, a tree-structured reference pattern storing unit has first through M-th node stages each of which has nodes that respectively store a reference pattern of inhibiting speakers. The reference pattern of each node of (N−1)-th node stage represents acoustic features in the reference patterns of predetermined ones of the nodes of the N-th node stage. An analysis unit analyzes input speech and converts the input speech into feature vectors. A similarities calculating unit calculates similarities between the feature vectors and the reference patterns of all of the inhibiting speakers. An inhibiting speaker selecting unit sorts the similarities and selects a predetermined number of inhibiting speakers. The similarities calculating unit calculates the similarity of the node of the first node stage and calculates the similarities of ones of the nodes of the N-th node stage which are connected to a predetermined number of nodes of the (N−1)-th node stage, selected in an order based on highest similarities.

4 Claims, 2 Drawing Sheets

TREE STRUCTURED COHORT SELECTION FOR SPEAKER RECOGNITION SYSTEM

BACKGROUND OF THE INVENTION

This invention relates to a speaker recognition system which selects inhibiting cohort reference patterns.

In a manner which will later be described more in detail, in conventional speaker recognition techniques, there is a problem that a recognition accuracy is decreased by such as differences of enrollment and test condition, for example, additive noise and line characteristics. In order to resolve this problem, a likelihood ratio normalizing method which uses inhibiting reference patterns is proposed by such as Higgins, Rosenberg, and Matsui. Concretely, there is, as a first document, "A. Higgins, L. Bahler, and J. Porter: "Speaker Verification Using Randomized Phrase Prompting", Digital Signal Processing, 1, pp. 89–106 (1991) ". Also, there is, as a second document, "Aaron E. Rosenberg, Joel DeLong, Chin-Hui Lee, Biing-Hwang Juang, Frank K. Soong: "The Use of Cohort Normalized Scores for Speaker Verification", ICSLP92, pp. 599–602 (1992)". Also, there is, as a third document, "Tomoko Matsui, Sadaoki Furui: "Speaker Recognition Using Concatenated Phoneme Models", ICSLP92, pp. 603–606 (1992)".

Generally, in the likelihood ratio normalizing method, N inhibit speakers are selected in an order from a speaker having a voice that is the closest to a voice of a true speaker. Therein, normalization of the likelihood ratio is carried out by subtracting each of likelihood ratios of the inhibit speakers from a likelihood ratio of the true speaker when distances are calculated in times of verifying. Here, there is such as a maximum likelihood of the inhibiting speakers or an average likelihood of the inhibiting speakers as the likelihood ratios of the inhibiting speakers to be subtracted. Since various differences of environments in times of recording and verifying influence both of the likelihood of the true speaker and the inhibiting speaker, it is possible to remove the various differences of environments in times of recording and verifying by subtracting the likelihood of the inhibiting speaker from the likelihood of the true speaker.

As explained in detail in the second document, the method of Rosenberg uses the utterance of the true speaker in the time of recording in case of calculating similarities in selection of inhibiting reference patterns. Also, as explained in detail in the first and the third documents, the methods of Higgins and Matsui use the utterance of the true person in the time of verifying in case of calculating similarities in selection of inhibiting reference patterns.

However, since the method of Rosenberg selects inhibiting speakers at the time of recording, effect of normalization is decreased when the environments in times of recording and verifying are different. Also, since the methods of Higgins and Matsui calculate, at the time of verifying, similarities between each of the inhibiting reference patterns and the utterance of the true person, a large processing amount requires patterns of a large number of speakers to calculate the similarities of reference of the utterance of the true person. Therefore, the methods of Higgins and Matsui select the inhibiting speakers from a small number of speakers. In this case, it is very difficult to select accurate inhibiting speakers.

SUMMARY OF THE INVENTION

It is therefore an object of this invention to provide a speaker recognition system which is capable of accurately selecting inhibiting reference patterns with a small processing amount.

Other objects of this invention will become clear as the description proceeds.

This invention provides a speaker recognition system comprising:

a tree-structured reference pattern storing unit having first through M-th node stages each of which has a plurality of nodes each of which memorizes a reference pattern of an inhibiting speaker, each of the nodes of (N)-th node stage being connected to predetermined ones of the nodes of the (N−1)-th node stage, the reference pattern of each of the nodes of the (N−1)-th node stage representing acoustic features in the reference patterns of the predetermined nodes of the N-th node stage, where M represents an integer greater than three and N represents an integer which is over one to M;

an analysis unit for analyzing an input verification utterance and for converting the verification utterance to feature vectors;

a similarity calculating unit connected to the tree-structured reference pattern memorizing unit and to the analysis unit for calculating similarities between the feature vectors and the reference patterns of all of the inhibiting speakers; and an inhibiting speaker selecting unit connected to the similarity calculating unit for calculating the similarities to select a predetermined number of inhibiting speakers.

The similarity calculating unit may calculate the similarities of ones of the nodes of the N-th node stage which are connected to a predetermined number of ones of the nodes of the (N−1)-th node stage selected in order from one of the nodes of the (N−1)-th node stage having the highest similarities; the similarity calculating unit using the similarities of ones of the nodes of the (N−1)-th node stage for unselected ones except the predetermined number of ones.

The tree-structured reference pattern storing unit may have a plurality of reference patterns of the inhibiting speakers in the M-th node stage.

DETAILED DESCRIPTION OF THE PREFERRED EMBODIMENT

First, a likelihood ratio normalizing method which uses inhibiting reference patterns will be described for a better understanding of this invention. In addition, in the following description, references to a likelihood ratio is substituted for distance between reference patterns.

As mentioned in the Background of the Invention section, in the likelihood ratio normalizing method, N inhibiting speakers are selected in an order from a speaker having a voice that is the most approximate to a voice of a true speaker. Therein, normalization of the likelihood ratio is carried out by subtracting each of likelihood ratios of the inhibiting speakers from a likelihood ratio of the true speaker when distances are calculated at the time of verifying. Here, there is such as a maximum likelihood of the inhibiting speakers or an average likelihood of the inhibiting speakers as the likelihood ratios of the inhibiting speakers to be subtracted.

In the likelihood ratio normalizing method which uses inhibiting reference patterns, a normalized likelihood ratio is given by the following equation (1).

$$\text{Score} = \log[p(O/I)] - \underset{k}{\text{stat}}[\log(p(O/ck(I))] \quad (1)$$

where $\log[p(O/I)]$ is the log likelihood of the observation vector sequence for model of I, $\log(p(O/ck(I)))$ is the log likelihood of the observation vector sequence for model of the k-th speaker in the cohort C(I) assigned to I, "stat" refers to some statistic, such as min or max, applied to the cohort scores, the size of the cohort is K, and Score is the normalized likelihood ratio.

Figure 1:
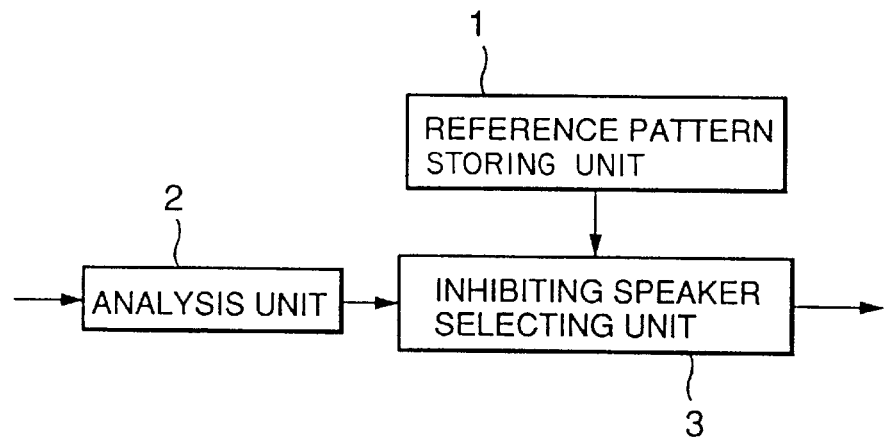
FIG. 1 is a block diagram of a conventional speaker recognition system.

Referring to FIG. 1, a conventional speaker recognition system will also be described for a better understanding of this invention.

In FIG. 1, the conventional speaker recognition system comprises a reference pattern storing unit 1, an analysis unit 2, and an inhibiting speaker selecting unit 3 connected to the reference pattern storing unit 1 and to the analysis unit 2.

The reference pattern storing unit 1 stores reference patterns of all of inhibiting speakers. The analysis unit 2 analyzes an input verification utterance to convert the verification utterance to feature vectors. The inhibiting speaker selecting unit 3 calculates similarities between the feature vector from the analysis unit 2 and the reference patterns of all of inhibiting speakers from the reference pattern storing unit 1. The inhibiting speaker selecting unit 3 sorts the similarities and select a predetermined number of inhibiting speakers which are selected in an order from speaker having a corresponding similarity that is the highest.

Since various differences of environments at times of recording and verifying influence both the likelihood of the true speaker and the inhibiting speaker, it is possible to remove the various differences of environments at times of recording and verifying by subtracting the likelihood of the inhibiting speaker from the likelihood of the true speaker.

As explained in detail in the second document, the method of Rosenberg uses the utterance of the true speaker at the time of recording in case of calculating similarities in selection of inhibiting reference patterns. Also, as explained in detail in the first and third documents, the methods of Higgins and Matsui use the utterance of the true speaker at the time of verifying in case of calculating similarities in selection of inhibiting reference patterns.

However, as described above, since the method of Rosenberg selects inhibiting speakers at the time of recording, effect of normalization is decreased when the environments at times of recording and verifying are different. Also, since the methods of Higgins and Matsui calculate, at the time of verifying, similarities between each of the inhibiting reference patterns and the utterance of the true person, a large processing amount is required on patterns of a large number of speakers to calculate the similarities of reference of the utterance of the true person. Therefore, the methods of Higgins and Matsui select the inhibiting speakers in a small number of speakers. In this case, it is difficult to select accurate inhibiting speakers.

Figure 2:
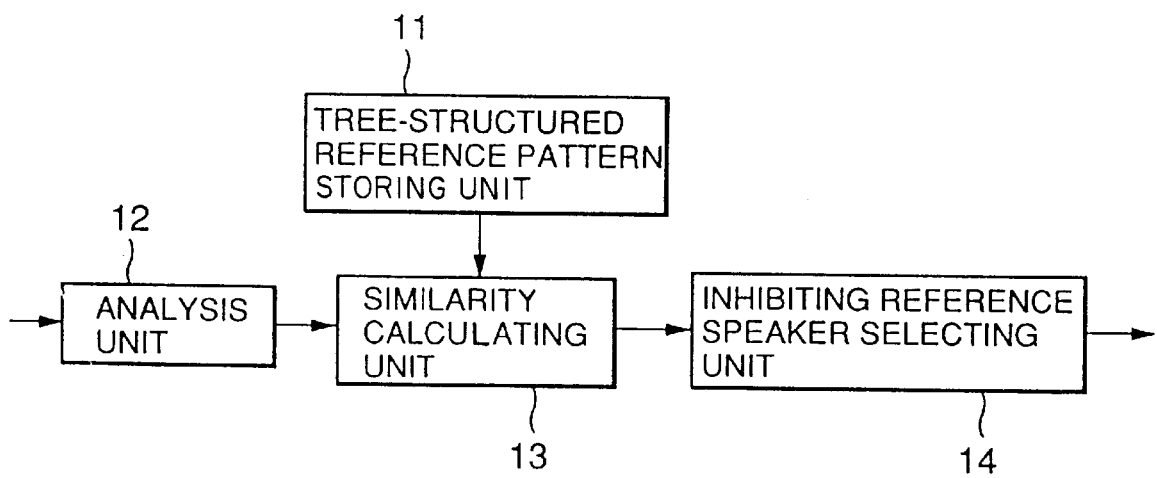
FIG. 2 is a block diagram of a speaker recognition system according to an embodiment of this invention.
Figure 3:
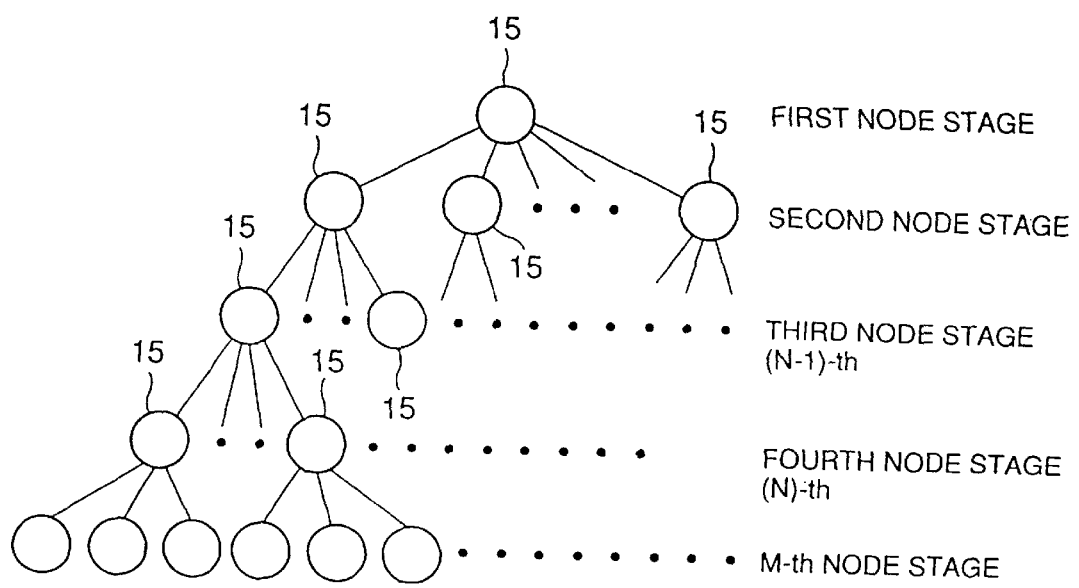
FIG. 3 is a view for use in describing a tree-structured reference pattern storing unit of the speaker recognition system illustrated in FIG. 2.

Referring to FIGS. 2 and 3, the description will proceed to a speaker recognition system according to an embodiment of this invention.

In FIG. 2, the speaker recognition system comprises a tree-structured reference pattern storing unit 11, an analysis unit 12, a similarity calculating unit 13 connected to the tree-structured reference pattern storing unit 11 and to the analysis unit 12, and an inhibiting reference speaker selecting unit 14 connected to the similarity calculating unit 13.

As shown in FIG. 3, the tree-structured reference pattern storing unit 11 has first through M-th node stages each of which (except the first node which has only one node) has a plurality of nodes 15 each of which stores a reference pattern of an inhibiting speaker, where M represents an integer greater than three. Each of the nodes 15 of (N)-th node stage is connected to predetermined ones of the nodes 15 of the (N–1)th node stage, where N represents an integer which is in the range of from one to M. The reference pattern of each of the nodes 15 of the (N–1)-th node stage represents acoustic features in the reference patterns of the predetermined ones of the nodes 15 of the N-th node stage. Namely, the tree-structured reference pattern storing unit 11 has a tree structure where the nodes of an N-th node stage are larger in number than the nodes of an (N–1)-th node stage, as shown in FIG. 3.

Turning to FIG. 2, the analysis unit 12 analyzes an input verification utterance and converts the input verification utterance to feature vectors. As the feature vectors, cepstrum and Δcepstrum are used. The cepstrum and Δcepstrum are described in a fourth document "Furui: "Digital Speech Processing", the issuing office of Toukai University, pp. 44–47, 1985" (also published as an English language version, entitled "Digital Speech Processing, Synthesis, and Recognition, published by Marcel Dekker, Inc. in 1989, pages 64–67). The similarity calculating unit 13 calculates similarities between the feature vector and the reference patterns of all of the inhibiting speakers. The inhibiting speaker selecting unit 14 sorts the similarities and selects a predetermined number of inhibiting speakers.

The similarity calculating unit 13 calculates the similarity of the node 15 of the first node stage. The similarity calculating unit 13 calculates the similarity of the node of the first node stage and calculates the similarities of ones of the nodes 15 of the N-th node stage which are connected to a predetermined number of ones of the nodes 15 of the (N–1)-th node stage selected in an order from one of the nodes 15 of the (N–1)-th node stage having the highest similarities. The similarity calculating unit 13 uses the similarities of ones of the nodes of the (N–1)-th node stage for unselected ones except the predetermined number of ones.

As shown in FIG. 3, the tree-structured reference patterns are implemented by the nodes 15 which correspond to speaker clusters. The node 15 of the first node stage corresponds to a speaker cluster of all of speakers.

A speaker clustering method is described in detail in a fifth document "Kai-FuLee "Large-Vocabulary Speaker-Independent Continuous Speech Recognition: The SPHINX System", CMU-CS-88-148, pp. 103–107 (1988.4)". Also, the tree structure of the reference pattern is described in detail in a sixth document "Kosaka, Matsunaga, Sagayama: "Tree-Structured Speaker Clustering for Speaker Adaptation", Singakugihou, SP93–110, pp. 49–54 (1193–12)". In addition, the reference pattern of the tree structure in the sixth document is used for adaptation of speaker. Therefore, the reference pattern of the tree structure in the sixth document is different in purpose of use from that of this invention.

In the speaker recognition system of this invention, the similarity calculating unit 13 calculates the similarities of the node 15 of the first node stage and calculates the similarities of ones of the nodes 15 of the N-th node stage that are connected to a predetermined number of ones of the nodes 15 of the (N–1)-th node stage that are selected in an order from one of the nodes of the (N−1)-th node stage that has the highest similarities. The similarity calculating unit 13 uses the similarities of ones of the nodes of the (N−1)-th node stage for unselected ones except the predetermined number of ones. As a result, the speaker recognition system is capable of, at a very high speed, calculating the similarities between the feature vector of the utterance of the true person and the reference patterns of all of the inhibiting speakers.

For example, in a case that the number of the inhibiting speakers is equal to 5000, the conventional speaker recognition system must calculate the similarities 5000 times. However, in the case that the number of the inhibiting speakers is equal to 5000, it is assumed that the number of the node stages is equal to 5, the number of nodes 15 in each of the node stages except the last stage that belongs to one node in a previous (lower-numbered) stage is equal to 10, and number of the predetermined number of ones of the nodes 15 of the (N−1)-th node stage that are selected is equal to 3 in the speaker recognition system of this invention. For the last stage, the number of nodes in that stage that belong to a same node of the previous (next-to-last) stage is equal to 5. In this event, since [10+(3*10)+(3*10)+(3*5)] is equal to 85, the speaker recognition system of this invention calculates the similarities 85 times. In the above equation, the first '10' signifies the number of calculations of similarities for ten nodes at the second node stage, the second '3*10' signifies the number of calculations of similarities for 3*10 nodes belonging, each as a lower node, to the three nodes selected at the second node stage, the third '3*10' signifies the number of calculations of similarities for 3*10 nodes belonging, each as a lower node, to the three nodes selected at the third node stage, and the fourth '3*5' signifies the number of calculations of similarities for 3*5 nodes belonging, each as a lower node, to the three nodes selected at the fourth node stage. As a result, the number of times of calculating the similarities in the speaker recognition system of this invention is equal to about (1/60) of that of the conventional speaker recognition system.

As for the similarity calculating method, DP matching method is known. The DP matching method is described in a seventh document "Sakoe, Chiba: "Continuous Speech Recognition based on time normalizing by using dynamic programming", Sound Journal, 27, 9, pp. 483–490 (1974. 9)". Also, for the similarity calculating method, the method of using Viterbi algorithm is known. The Viterbi algorithm is described in an eight document "L. R. Rabiner and M. M. Sondhi: "On the application of vector quantization and hidden markov models to speaker-independent, isolated word recognition", ibid, pp. 1075–1105".

In addition, since the speaker recognition system can calculate the similarities between the feature vector of the utterance of the true person and the reference patterns of all of the inhibiting speakers, the speaker recognition system can select ones of the inhibiting speakers that have optional similarities. For example, when the inhibiting speakers which are similar to the true person are needed, the speaker recognition system sorts the similarities and selects the predetermined number of inhibiting speakers which correspond to ones which are selected in an order from the one of the nodes 15 of the N-th node stage that has a highest similarity. Also, when the inhibiting speakers which are dissimilar to the true person are needed, the speaker recognition system sorts the similarities and selects the predetermined number of inhibiting speakers which correspond to ones which are selected in an order from one of the nodes 15 of the N-th node stage that has a lowest similarity. In addition, the speaker recognition system may store, as a part of reference patterns of speaker of the tree structure, the reference patterns of the inhibiting speakers that are selected by using the true person at the time of recording. In this event, it is possible to select, as the inhibiting speakers, both of the inhibiting speakers selected at the time of recording and the inhibiting speakers at the time of verifying.

Thus, since the speaker recognition system can select, at a remarkably high speed, the inhibiting speakers by using the reference patterns of the inhibiting speakers of the tree structure, the speaker recognition system can select the inhibiting speakers in a large number of speakers at the time of verifying. Thereby, when the environments at the times of recording and verifying are greatly different, the speaker recognition system can accurately select the reference patterns of the inhibiting speakers.

What is claimed is:

1. A speaker recognition system comprising:

a tree-structured reference pattern storing unit having first through M-th node stages with the first node stage having one node and with each of the second through M-th node stages having a plurality of nodes, each of said nodes storing a reference pattern of an inhibiting speaker, each of said nodes of an (N)-th node stage being connected to predetermined ones of said nodes of said (N−1)-th node stage, said reference pattern of each of said nodes of said (N−1)-th node stage representing acoustic features in said reference patterns of the predetermined ones of said nodes of said N-th node stage, where M represents an integer greater than three and N represents an integer from one to M;

an analysis unit for analyzing an input verification utterance and for converting said input verification utterance to feature vectors;

a similarities calculating unit connected to said tree-structured reference pattern storing unit and to said analysis unit for calculating similarities between said feature vectors and said reference patterns of all of said inhibiting speakers; and an inhibiting speaker selecting unit connected to said similarities calculating unit for calculating said similarities to select a predetermined number of said inhibiting speakers.

2. A speaker recognition system as claimed in claim 1, wherein said similarities calculating unit calculates said similarities of ones of said nodes of said N-th node stage which are connected to a predetermined number of ones of said nodes of said (N−1)-th node stage selected in order from one of said nodes of said (N−1)-th node stage having the highest similarities; and wherein said similarities calculating unit uses said similarities of ones of said nodes of said (N−1)-th node stage for unselected ones of said nodes except said predetermined number of ones.

3. A speaker recognition system as claimed in claim 1, wherein said tree-structured reference pattern storing unit has a plurality of reference patterns of said inhibiting speakers in said M-th node stage.

4. A speaker recognition system as claimed in claim 2, wherein said tree-structured reference pattern storing unit has a plurality of reference patterns of said inhibiting speakers in said M-th node stage.

* * * * *